Patented Nov. 20, 1934

1,981,811

UNITED STATES PATENT OFFICE 1,981,811

PROCESS FOR RECLAIMING RUBBER AND SIMILAR SUBSTANCES

Anderson W. Ralston, Chicago, Ill., and James R. Wright, Baton Rouge, La., assignors to Standard Oil Development Company No Drawing. Application March 14, 1932, Serial No. 598,876

9 Claims. (Cl. 18—52)

The present invention relates to the art of purification and/or recovery of such materials as rubber, gutta percha and related substances capable of vulcanization. The process will be understood from the following description:

Rubber and related substances which are vulcanized by the addition of sulphur have been recovered for re-use in various ways, the most important and familiar method involving the digestion of the material in a solution of caustic soda. This reagent has the power of recovering a great part of the sulphur, but the recovered rubber substance is not identical with the crude rubber. Part of the sulphur is difficult to remove, and probably due to structural changes in the molecule, the recovered substance is found to have lost a great part of its desirable characteristics, especially its elasticity and the power to be vulcanized. It is re-used as a diluent and partial substitute for raw, or crude rubber but cannot generally replace it.

The present invention relates to a new method for the recovery, purification or devulcanization of rubber and related substances, and proceeds by hydrogenation. We have found that the sulphur is the most reactive part of the vulcanized molecule, and that under certain conditions the sulphur may be removed by hydrogenation in the form of sulphuretted hydrogen, and that the rubber so recovered in an unvulcanized form is possessed of almost all of the desired characteristics of raw rubber. It is highly elastic, and in all other respects is little inferior to the crude product. It may be used to replace raw rubber almost completely in most instances, and in any case is greatly superior to the material produced by the methods of recovery now in general use. The present method will be carried out in a variety of different ways, but in each case the rubber is subjected to the action of hydrogen, preferably under elevated pressures, for example, in excess of 20 or 50 atmospheres, or even up to 100 or 200 atmospheres. The temperature is generally below about 450 or 550° F. or in other words, the temperature at which the decomposition of the rubber, or other similar substance becomes rapid and is preferably within the range from about 200 or 300° F. to 400 or 450° F. The rubber may be treated in a dry state, that is to say, in absence of a solvent, or solvent may be used such as aromatic or hydroaromatic hydrocarbons, or aliphatic hydrocarbons, although these are generally less desirable due to their inferior solvent power. Phenolic oils and the like may also be used, which may or may not be reduced under the conditions of operation. The material to be recovered is preferably reduced to a fine state of subdivision either by grinding, cutting or similar operations, and as stated above, may be subjected in its dry state, or in the presence of solvents. Where it is treated in a dry state, the material is preferably kept in continuous movement so as to continually expose new surface of the solid rubber, and while in a wet state solvents may be used in relatively small quantities so as to merely soften the rubber, or they may be used in relatively large quantities so as to cause a partial or complete solubility. In the recovery of the softer types of vulcanized rubber, it may also be desirable to subject it to a vigorous mechanical working prior to the hydrogenation or solvent treatment or during such treatment.

While the present method is practical to a certain extent in the absence of catalytic materials, the addition of certain substances considerably improves the process. The catalysts generally preferred are of the class which are immune to sulphur poisoning, and among these oxides, sulphides, nitrides and other compounds of the sixth group metals are perhaps the most desirable. Nitrogen compounds such as ammonia are useful, especially when the rubber is recovered without the use of solvents. These materials may be used alone or in mixture with each other; for example, ammonium molybdate is a desirable catalyst. Mixtures of molybdenum and tungsten sulphides may be used, or these substances may be mixed with difficultly reducible oxides, rare earths and alkaline earths, for example, aluminum oxide, thoria or magnesia. Zinc oxide is frequently a desirable addition. Oil soluble compounds of the sixth group metals, such as the soaps or soluble metallo-organic materials are useful.

Aromatics are particularly useful as solvents and the hydrogenated naphthalenes are preferred among these. The ordinary types of catalysts mentioned above can be eliminated altogether when hydrogenated naphthalenes are used since these appear to act as catalysts in themselves being capable of taking up hydrogen and transferring it to the sulphur contained in the rubber.

The reaction is accomplished within a relatively short time; two or three hours is usually sufficient to remove relatively small amounts of sulphur, but it will be appreciated that as the amount of sulphur greatly increases longer time will be necessary. At the most elevated temperatures the time of reaction is also decreased, and in general, increase of pressure tends to the same result. It is highly important to carefully adjust the factors such as temperature, time, pressure and catalytic activity so as to obtain the optimum conditions for sulphur elimination and the minimum saturation of the rubber. A slight saturation will generally occur in any case, but a suitable adjustment of the various conditions is possible so that it may be greatly minimized. It is sometimes desirable to saturate the rubber to some extent and hydrorubber is then produced. On the other hand, if the pressure is reduced and the time is likewise cut shorter, the recovered rubber may be obtained in a condition very similar to the raw product. While the process has been described as a method for devulcanizing or desulphurizing rubber it is not necessary to produce a completely devulcanized product. Sometimes it is desirable to soften or partially devulcanize by this means and this rubber may be readily added to raw rubber for vulcanization. The amount of sulphur used may be reduced by this means, with other advantages apparent to those skilled in the art.

The reaction may be carried out in batch or continuously, or in a semi-continuous manner in any form of apparatus capable of withstanding the reaction conditions and bringing about a thorough mixing of the hydrogen-containing gases with the rubber. Means may be provided for mascerating the rubber during hydrogenation, or for continuously wetting the surface of the rubber exposed to the hydrogen, or for completely dissolving the rubber before or during the hydrogenation step.

Our process is not to be limited by any theory of the chemical reactions involved, nor to any specific method of operation, catalyst or conditions which may be specified to illustrate the general operation of our method. Our process is to be limited only by the following claims in which we wish to claim all novelty inherent in the invention.

We claim:

1. An improved process for the devulcanization of rubber and rubber-like substances, which comprises subjecting the vulcanized rubber to the action of hydrogen under pressure in excess of 20 atmospheres, and at a temperature below the decomposition temperature of rubber for a time sufficient to eliminate the sulphur but insufficient to saturate the rubber.

2. An improved process for the devulcanization of rubber and rubber-like substances, which comprises subjecting the vulcanized rubber to the action of hydrogen under pressure in excess of 20 atmospheres at a temperature below the decomposition temperature of rubber, and in the presence of a hydrogenating catalyst active in the presence of sulphur, for a time sufficient to eliminate the sulphur but insufficient to cause appreciable saturation of the rubber.

3. An improved process for the devulcanization of rubber and rubber-like substances, which comprises reducing the vulcanized rubber to finely divided particles, suspending the particles in a rubber solvent, then subjecting the suspension to the action of hydrogen under pressure in excess of 20 atmospheres, and at a temperature below the decomposition temperature of rubber, for a time sufficient to eliminate the sulphur but insufficient to cause appreciable saturation of the rubber.

4. Process according to claim 1 in which the vulcanized rubber is subjected to the action of hydrogen at a temperature between 200 and 450° F.

5. Process according to claim 1 in which the vulcanized rubber is subjected to the action of hydrogen at a temperature between 300 and 400° F.

6. Process according to claim 1 in which the vulcanized rubber is subjected to the action of hydrogen under pressure in excess of 50 atmospheres.

7. Process according to claim 3 in which the solvent comprises a hydrogenated naphthalene.

8. Process according to claim 3 in which a hydrogenated naphthalene serves both as the solvent and as the hydrogenating catalyst.

9. Process according to claim 1 in which the vulcanized rubber is first softened by digestion with a rubber solvent.

ANDERSON W. RALSTON.
JAMES R. WRIGHT.